United States Patent
Hashimoto et al.

(10) Patent No.: US 9,810,588 B2
(45) Date of Patent: Nov. 7, 2017

(54) OPTICAL FIBER TEMPERATURE SENSOR

(75) Inventors: Eiji Hashimoto, Tokyo (JP); Koji Dojo, Tokyo (JP); Takeshi Obata, Fukushima (JP)

(73) Assignees: TOSHIBA MITSUBISHI-ELECTRIC INDUSTRIAL SYSTEMS CORPORATION, Tokyo (JP); KITASHIBA ELECTRIC CO., LTD., Fukushima-shi (JP)

( * ) Notice: Subject to any disclaimer, the term of this patent is extended or adjusted under 35 U.S.C. 154(b) by 543 days.

(21) Appl. No.: 14/405,982

(22) PCT Filed: Jun. 6, 2012

(86) PCT No.: PCT/JP2012/064525
§ 371 (c)(1),
(2), (4) Date: Apr. 29, 2015

(87) PCT Pub. No.: WO2013/183126
PCT Pub. Date: Dec. 12, 2013

(65) Prior Publication Data
US 2015/0285692 A1    Oct. 8, 2015

(51) Int. Cl.
*G01K 11/32*    (2006.01)
*G01K 3/00*     (2006.01)
(Continued)

(52) U.S. Cl.
CPC ............ *G01K 11/32* (2013.01); *G01K 1/14* (2013.01); *G01K 13/00* (2013.01); *H02B 3/00* (2013.01); *H02G 5/005* (2013.01)

(58) Field of Classification Search
CPC .......... G01K 3/00; G01K 13/00; G01K 11/32; G01K 11/00; G01K 1/16; G01K 1/14; H02B 3/00
(Continued)

(56) References Cited

U.S. PATENT DOCUMENTS 5,028,146 A * 7/1991 Wada ............... G01K 11/32
 374/129
5,035,511 A * 7/1991 Berthold ............ G01K 11/32
 250/227.12
(Continued)

FOREIGN PATENT DOCUMENTS

CN    102235884 A    11/2011
JP    3 256518       11/1991
(Continued)

OTHER PUBLICATIONS

Combined Chinese Office Action and Search Report dated Feb. 22, 2016 in Patent Application No. 201280073665.4 (with English Translation of Categories of Cited Documents).
(Continued)

*Primary Examiner* — Gail Kaplan Verbitsky
(74) *Attorney, Agent, or Firm* — Oblon, McClelland, Maier & Neustadt, L.L.P.

(57) ABSTRACT

An optical fiber temperature sensor implements a temperature monitoring function in an interphase insulating material between sandwich bus bars. The optical fiber temperature sensor is formed by housing an optical fiber cable in a housing formed from an ultra-thin sheet made from an insulating material having insulation quality equal to or higher than interphase insulating material between sandwich bus bars. Multiple ultra-thin columnar members, each made from same material as is housing, are housed in multiple locations in housing. Multiple sensor rings are each formed by unfixedly winding a portion of optical fiber cable with a length equal to or longer than that corresponding to range resolution around corresponding one of ultra-thin columnar members. The multiple sensor rings measure temperatures in multiple locations. Silicone sealing is applied to housing side surfaces. All surfaces of housing are sealed with a
(Continued)

hermetic sealing member made from a silicone-based liquid insulating material.

3 Claims, 6 Drawing Sheets

(51) Int. Cl.
*G01K 1/16* (2006.01)
*G01K 13/00* (2006.01)
*G01K 1/14* (2006.01)
*H02B 3/00* (2006.01)
*H02G 5/00* (2006.01)

(58) Field of Classification Search
USPC ....... 374/120, 121, 130, 131, 161, 141, 208, 374/137; 385/12
See application file for complete search history.

(56) References Cited

U.S. PATENT DOCUMENTS

| | | | | |
|---|---|---|---|---|
| 5,383,207 | A | * | 1/1995 | Culverhouse .......... G01D 5/344 356/43 |
| 5,991,479 | A | * | 11/1999 | Kleinerman .............. G01J 5/08 250/227.11 |
| 2004/0179575 | A1 | * | 9/2004 | Markham ............. G01J 5/0022 374/121 |
| 2012/0243572 | A1 | * | 9/2012 | Matsudo ............... G01J 5/0007 374/161 |

FOREIGN PATENT DOCUMENTS

| | | |
|---|---|---|
| JP | 4 20823 | 1/1992 |
| JP | 4-174331 A | 6/1992 |
| JP | 7 151809 | 6/1995 |
| JP | 7 181086 | 7/1995 |
| JP | 8 4499 | 1/1996 |
| JP | 9 130927 | 5/1997 |
| JP | 2000 356473 | 12/2000 |
| JP | 2002 81998 | 3/2002 |
| JP | 2006-177780 A | 7/2006 |
| JP | 2006 254623 | 9/2006 |
| JP | 2010 129406 | 6/2010 |
| WO | WO 2012/063062 A2 | 5/2012 |

OTHER PUBLICATIONS

International Search Report dated Jul. 24, 2012 in PCT/JP12/064525 Filed Jun. 6, 2012.
Office Action dated Sep. 21, 2015 in Korean Patent Application No. 10-2014-7036641 (with English language translation).

* cited by examiner (A)

(B)

US 9,810,588 B2

OPTICAL FIBER TEMPERATURE SENSOR

TECHNICAL FIELD

The present invention relates to an optical fiber temperature sensor configured to constantly monitor an abnormality in the temperature of components, such as bus bars and bolts constituting the inside of an electric appliance.

BACKGROUND ART

With regard to inverter boards in recent years, as the frequency of switching operations becomes higher, a switching surge voltage becomes larger due to the inductance in the bus bars in the inverter boards. For this reason, it is important to reduce the switching surge voltage. Employment of so-called sandwich bus bars is effective for a reduction in the inductance. The sandwich bus bars include: a bus bar from which switching current flows into an end of a switching circuit for load control; and a bus bar to which the switching current flows out from the other end of the switching circuit. The two bus bars are set opposite each other with an electrically-insulating material interposed in between.

However, inverter boards are likely to develop trouble, such as short-circuit, due to aging of the sandwich bus bars, and deterioration in insulation performance of the interphase insulating material between the sandwich bus bars. Conventional methods, however, cannot prevent such trouble.

Furthermore, fastening bolts and the like for connecting the bus bars also become loose due to aging, vibration and shock. This leads to a problem of local overheating.

A solution to problems like these is to perform monitoring to prevent sudden trouble inside an electrical appliance board such as an inverter board.

Temperature monitoring apparatuses using optical fibers are used in a method of monitoring temperature abnormalities. Such temperature monitoring apparatuses are put into operation in various fields including tunnel disaster prevention facilities (see PTL 1, for example).

According to PTL 1, one optical fiber cable installed in a tunnel along the lengthwise direction functions in its entire length as a temperature sensor, and collectively measures the temperature distribution in the entire length of the optical fiber cable from one end to the other. Thereby, it is detected whether a fire breaks out.

Although the tunnel disaster prevention facility described in PTL 1 is capable of measuring the temperature distribution along the optical fiber cable in the lengthwise direction, the temperature measurement points are determined depending on the range resolution. For this reason, the tunnel disaster prevention facility are used for large-scale components, and large-scale linear structures typified by tunnels. Such optical fiber temperature monitoring apparatus, as it is, cannot be applied to very narrow spaces inside the appliances.

The applications of optical fiber temperature monitoring apparatuses to narrow spaces are disclosed in PTL 2 and PTL 3.

In an optical fiber temperature sensor described in PTL 2, a portion of an optical fiber cable with a length equal to or longer than that corresponding to the range resolution is wound to measure a local temperature. According to PTL 2, the sensor unit is fixed together with an enhanced thermally-conductive filler using an adhesive, and is disposed in contact with a measurement object.

The temperature measurement precision of the optical fiber cable, however, decreases due to the fixing of the optical fiber cable and the enhanced thermally-conductive filler using the adhesive.

CITATION LIST

Patent Literature

[PTL 1] Japanese Patent Application Publication No. Hei 8-4499
[PTL 2] Japanese Patent Application Publication No. Hei 7-181086
[PTL 3] Japanese Patent Application Publication No. 2000-356473

SUMMARY OF INVENTION

Technical Problem

According to PTL 3, the object temperature of a crucible-type induction furnace is detected using optical fiber cables which are buried in a fire-resistant body for forming the crucible. PTL 3 is intended to detect only one temperature at the highest temperature location in an object having a certain capacity, and is not a case which needs specific measures for the temperature detection resolution of the optical fiber cable. In other words, PTL 3 is not suitable to detect multiple temperatures in the respective local positions in a narrow space.

As described above, the conventional optical fiber temperature monitoring apparatuses can be easily applied to the operations of large-scale components and large-scale linear structures. However, no conventional optical fiber temperature monitoring apparatus has been yet applied to the operation in a limited space and narrow range like an inverter board. No conventional optical fiber temperature monitoring apparatus is capable of monitoring serious abnormalities, particularly the overheating of the bus bar.

An object of the present invention is to provide an optical fiber temperature sensor capable of constantly monitoring temperatures respectively in multiple desired locations, and accordingly making it possible to prevent trouble, in the narrow range.

Solution to Problem

To attain the object, an optical fiber temperature sensor according to the present invention provides an optical fiber temperature sensor, which implements a temperature monitoring function in an interphase insulating material between sandwich bus bars, and is characterized by the following features. Specifically, the optical fiber temperature sensor is formed by housing an optical fiber cable in a housing which is formed from an ultra-thin sheet made from an insulating material having insulation quality equal to or higher than the interphase insulating material between the sandwich bus bars. Multiple ultra-thin columnar members, each made from the same material as the housing, are housed in multiple locations in the housing. Multiple sensor rings are each formed by unfixedly winding a portion of the optical fiber cable with a length equal to or longer than that corresponding to range resolution around the corresponding one of the ultra-thin columnar members. The multiple sensor rings measure temperatures in the multiple locations, respectively. Silicone sealing is applied to housing side surfaces.

All surfaces of the housing are hermetically sealed with a hermetic sealing member made from a silicone-based liquid insulating material.

DESCRIPTION OF EMBODIMENTS

Figure 1:
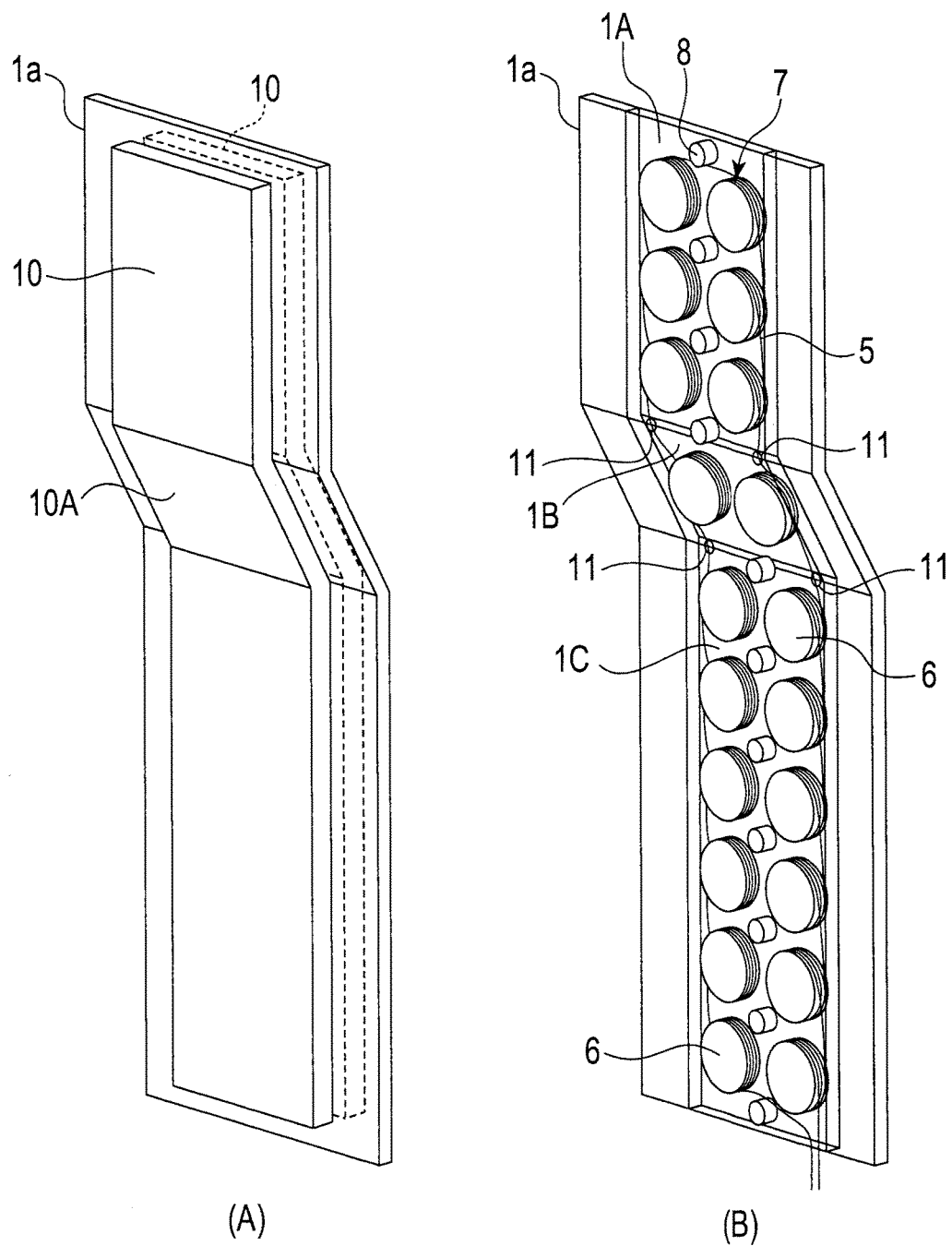
FIG. 1 is a view showing an instance of an optical fiber temperature sensor according to example 1 of the present invention.

Referring to the drawings, descriptions will be hereinbelow provided for an optical fiber temperature sensor according to an embodiment of the present invention.

Example 1

FIG. 1 is a view showing an instance of an optical fiber temperature sensor according to example 1 of the present invention. FIG. 1(A) is a perspective view showing the structures of two sandwich bus bars 10 and an optical fiber temperature sensor 1a. FIG. 1(B) is a perspective view showing the structure of the optical fiber temperature sensor 1a.

The optical fiber temperature sensor 1a shown in FIG. 1 is disposed (in the interphase) between the two sandwich bus bars 10 in the board. In the example shown in FIG. 1, a bent portion 10A is formed in each sandwich bus bar 10, and the optical fiber temperature sensor 1a is produced in a way that a housing 1B is formed parallel with the bent portion 10A.

The optical fiber temperature sensor 1a has a housing 1A, the housing 1B connected to the housing 1A, and a housing 1C connected to the housing 1B in a location facing the two sandwich bus bars 10.

Figure 3:
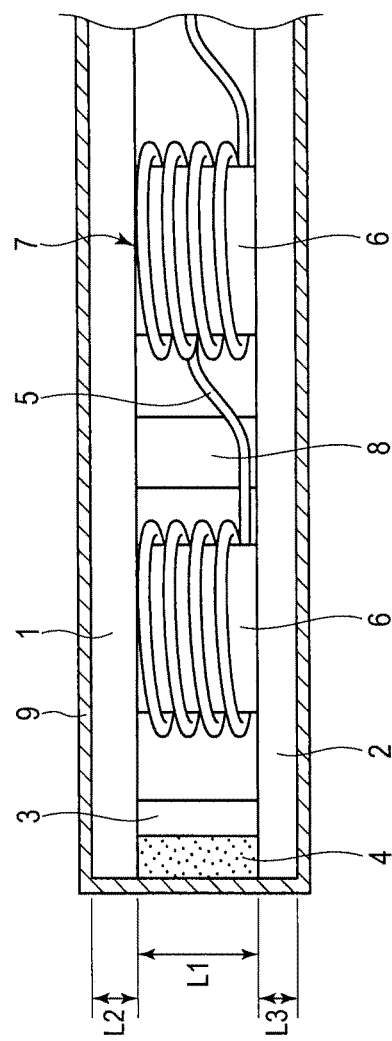
FIG. 3 is a cross-sectional view of the optical fiber temperature sensor according to example 1 of the present invention.

FIG. 3 is a cross-sectional view of the optical fiber temperature sensor 1a according to example 1 of the present invention. The housings 1A to 1C included in the optical fiber temperature sensor 1a are each formed from an ultra-thin insulating sheet. As an insulating material which can be molded into an ultra-thin sheet, a glass epoxy resin laminated board is used for the housings.

The housings 1A to 1C are each formed from a housing upper surface 1, a housing bottom surface 2 and housing side surfaces 3. An optical fiber cable 5 is housed inside each of the housings 1A to 1C.

A silicone sealing 4 is applied to the housing side surfaces 3 using a silicone sealing material. All the surfaces of each housing is hermetically sealed with a hermetic sealing member 9 made from a silicone-based liquid insulating material. The hermetic quality can be enhanced using the hermetic sealing member 9.

Multiple ultra-thin columnar members 6 made from the same material as the housing are housed in multiple locations inside each housing. Multiple sensor rings 7 are each formed by unfixedly winding a portion of the optical fiber cable 5 with a length equal to or longer than that corresponding to the range resolution around the corresponding one of the multiple ultra-thin columnar members 6. Because of the multiple sensor rings 7, the optical fiber cable 5 can detect temperatures in the respective locations without breaking even if shakes or excessive force is applied to the optical fiber cable 5.

Furthermore, the provision of the multiple sensor rings 7 makes it possible to detect temperatures in desired locations in an area where the sensor rings 7 face the sandwich bus bars 10.

Moreover, circular spacers 8, each having the same configuration as and formed from the same material as the ultra-thin columnar members 6, are disposed so as to fill the spaces between the sensor rings 7. For this reason, even if excessive force is applied to the optical fiber temperature sensor and the optical fiber cable 5, neither the optical fiber temperature sensor nor the optical fiber cable 5 breaks, and the optical fiber cable 5 is capable of detecting the temperatures.

For the purpose of reducing the wiring distance, it is desirable that: the sandwich bus bars 10 be very close to each other; and the thickness of the optical fiber temperature sensor 1a be as thin as possible. To this end, the housing upper surface 1 and the housing bottom surface 2 are the ultra-thin sheets with thicknesses L2, L3 of 0.5 mm. The thickness L1 of the sensor rings 7 and the circular spacers 8 is set at 1 mm as a minimum dimension needed to wind the optical fiber cable 5. Accordingly, the entire thickness of the optical fiber temperature sensor 1a is set at 2 mm. The optical fiber cable 5 is wound around each ultra-thin columnar member 6 with a slight clearance in between.

The optical fiber cable 5 shown in FIG. 1(B) is formed into the multiple sensor rings 7 by, starting from the lower end of the optical fiber temperature sensor 1a, being sequentially wound around the multiple ultra-thin columnar members 6 arranged in the right row in the optical fiber temperature sensor 1a. Furthermore, the optical fiber cable 5 is formed into the other multiple sensor rings 7 by, starting from the upper end of the optical fiber temperature sensor 1a, being sequentially wound around the multiple ultra-thin columnar members 6 arranged in the left row in the optical fiber temperature sensor 1a. The optical fiber cable 5 is hence brought back to the lower end of the optical fiber temperature sensor 1a.

In this case, through-holes 11 are provided to the housing side surfaces 3 of the housings 1A to 1C. The housings 1A to 1C are integrated into one unit by connecting the housings together with the optical fiber cable 5 passing through the through-holes 11.

Figure 2:
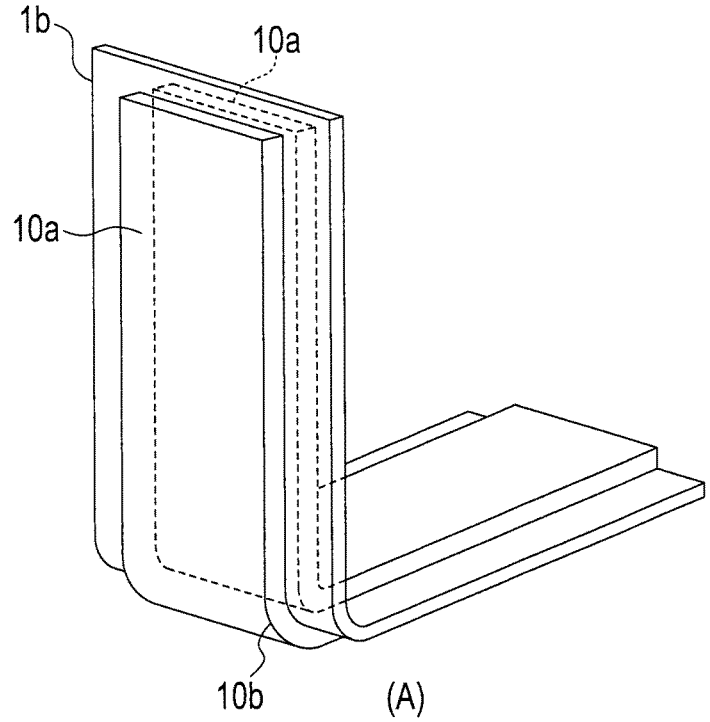
FIG. 2 is a view of another instance of the optical fiber temperature sensor according to example 1 of the present invention.
Figure 2:
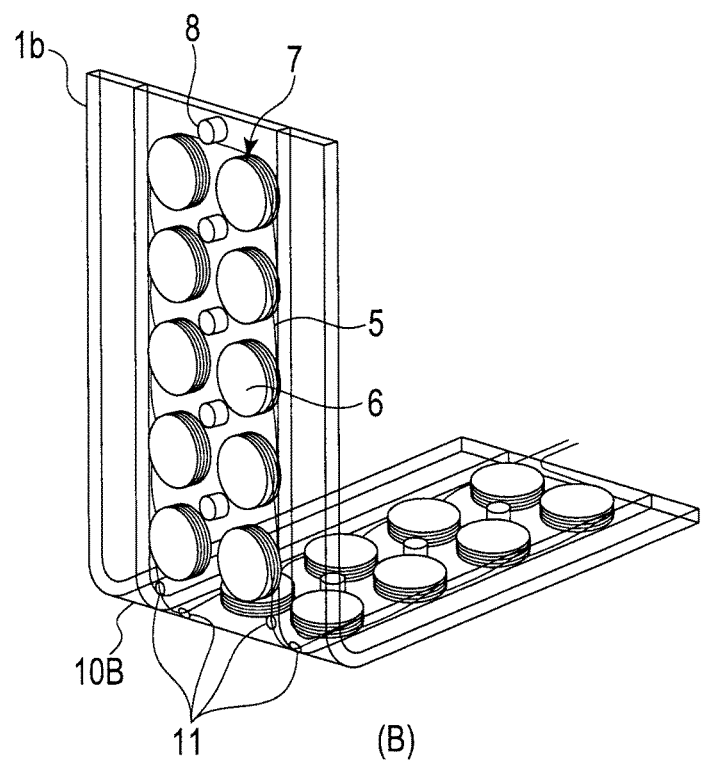

FIG. 2 is a view showing another instance of the optical fiber temperature sensor of example 1 of the present invention. FIG. 2(A) is a perspective view showing structures of two sandwich bus bars 10a and a structure of an optical fiber temperature sensor 1b. FIG. 2(B) is a perspective view showing the structure of the optical fiber temperature sensor 1b.

The optical fiber temperature sensor 1b shown in FIG. 2 is disposed between phases of the two sandwich bus bars 10a in the board. In the example shown in FIG. 2, a right-angle bent portion 10b is formed in each sandwich bus bar 10a, and the optical fiber temperature sensor 1b is produced in such a way that a right-angle bent portion 10B is formed parallel with the right-angle bent portion 10b. Through-holes 11 are provided to the right-angle bent portion 10B. The housings are integrated into one unit by connecting the housings together with the optical fiber cable 5 passing through the through-holes 11.

The optical fiber temperature sensors 1a, 1b shown in FIGS. 1 and 2 are each produced with a width wider than the sandwich bus bar 10 or 10a for the purpose of enhancing the quality of interphase insulation between the sandwich bus bars 10 or 10a. A temperature monitoring section formed from the sensor rings 7 and the circular spacers 8 is provided to only areas where the sandwich bus bars 10 or 10a overlap each other.

As described above, the optical fiber temperature sensor according to example 1 is placed very close to the opposed sandwich bus bars 10 or 10a. For this reason, the optical fiber temperature sensor is capable of constantly monitoring the temperatures respectively in the multiple desired locations, and makes it possible to prevent trouble. In other words, the optical fiber temperature sensor is capable of collecting a time-series change in the temperature from any position in each sensor ring 7. The aging and an abnormality of any of the sandwich bus bars 10, 10a can be monitored by observing their temperature change trends, such as sudden and rapid temperature changes as well as gradual and continuous temperature rises.

In addition, the ultra-thin sheet structure enables the optical fiber temperature sensor to be installed in a narrow space, and this structure is excellent in achieving a lightweight property. Moreover, the optical fiber temperature sensor can be easily replaced, removed and attached for the maintenance purpose.

Example 2

Figure 4:
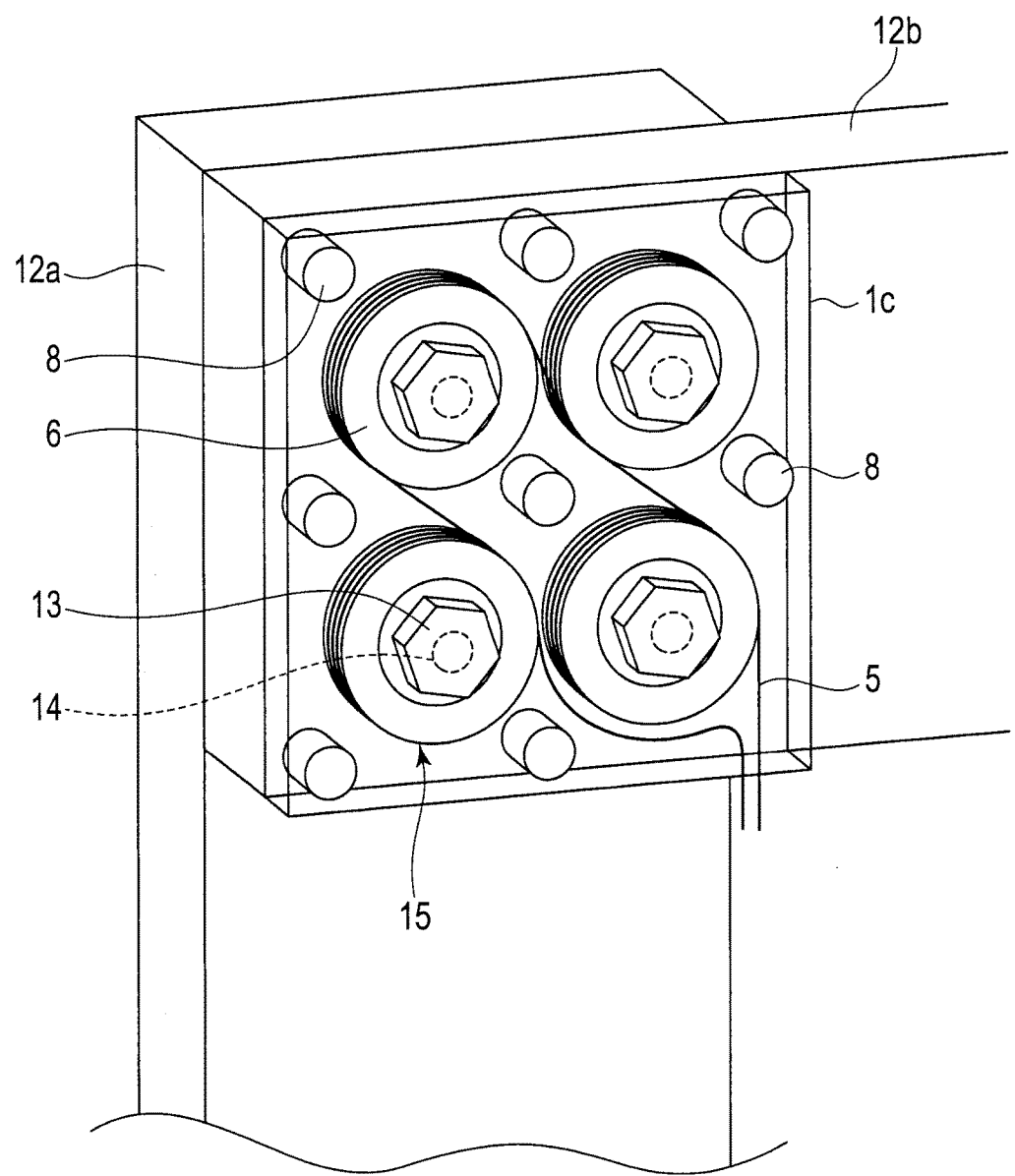
FIG. 4 is a view showing a structure of an optical fiber temperature sensor according to example 2 of the present invention.

FIG. 4 is a view showing a structure of an optical fiber temperature sensor according to example 2 of the present invention.

In FIG. 4, a bus bar 12a (a first bus bar) and a bus bar 12b (a second bus bar) are bolt-fastened to each other using bolts 13. The feature of the optical fiber temperature sensor 1c in this case is to monitor the overheating of each bolt 13 in the bus bar connecting portion which is due to the concentration of current on the bolt 13 as a result of becoming loose. An optical fiber temperature sensor 1c is formed from an ultra-thin sheet, and is disposed on the bus bar 12b. The internal structure of the optical fiber temperature sensor 1c is the same as the structure shown in FIG. 3.

In FIG. 4, multiple sensor rings 15 each having a bolt hole 14 are formed. Specifically, the housing of the optical fiber temperature sensor 1c is formed from a glass-epoxy resin laminated board. The bolt holes 14 (the through-holes) matching the diameter of the bolts 13 are formed in the housing surface of the optical fiber temperature sensor 1c which is in contact with the bus bar 12b. Thereby, the optical fiber temperature sensor 1c is made to have a function as a glass-epoxy washer.

To put it concretely, the multiple ultra-shin circular members 6 are provided respectively with the bolt holes 14, matching the diameter of the bolts 13, and to which to attach the bolts. Passing through the bolt holes 14, the bolts 13 are bolt-fastened to the bus bar 12a and the bus bar 12b. Thereby, the optical fiber temperature sensor 1c is capable of monitoring the overheating of each bolt 13 in the bus bar connecting portion which is due to the concentration of current on the bolt 13 as a result of becoming loose.

Figure 5:
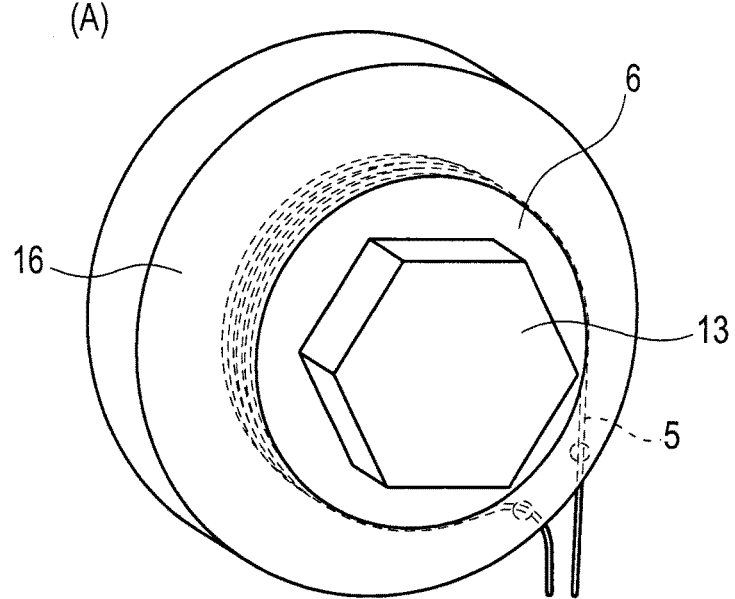
FIG. 5 is a view showing a sheet-shaped configuration of the optical fiber temperature sensor according to example 2 of the present invention, the sheet-shaped configuration matching a single bus bar connection portion.
Figure 5:
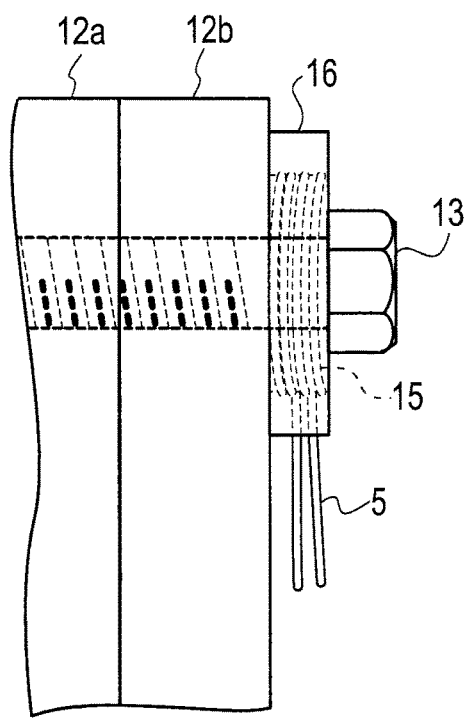

FIG. 5 is a view showing a sheet-shaped structure of the optical fiber temperature sensor according to example 2 of the present invention, the sheet-shaped configuration matching a single bus bar connection portion. FIG. 5(A) is a perspective view of the optical fiber temperature sensor. FIG. 5(B) is a cross-sectional view of the optical fiber temperature sensor. In FIG. 5, the optical fiber cable 5 is guided to a housing 16 from a measuring apparatus, which is not illustrated, and the sensor ring 15 is formed by winding the optical fiber cable 5 around the ultra-thin circular member 6 inside the housing 16 multiple times. Inserted through the sensor ring 15, the bolt 13 is bolt-fastened to the bus bar 12a and the bus bar 12b. Thereby, the optical fiber temperature sensor functions as a glass-epoxy washer having a temperature sensing function as in the case of FIG. 4, and can be formed into a desired shape.

Figure 6:
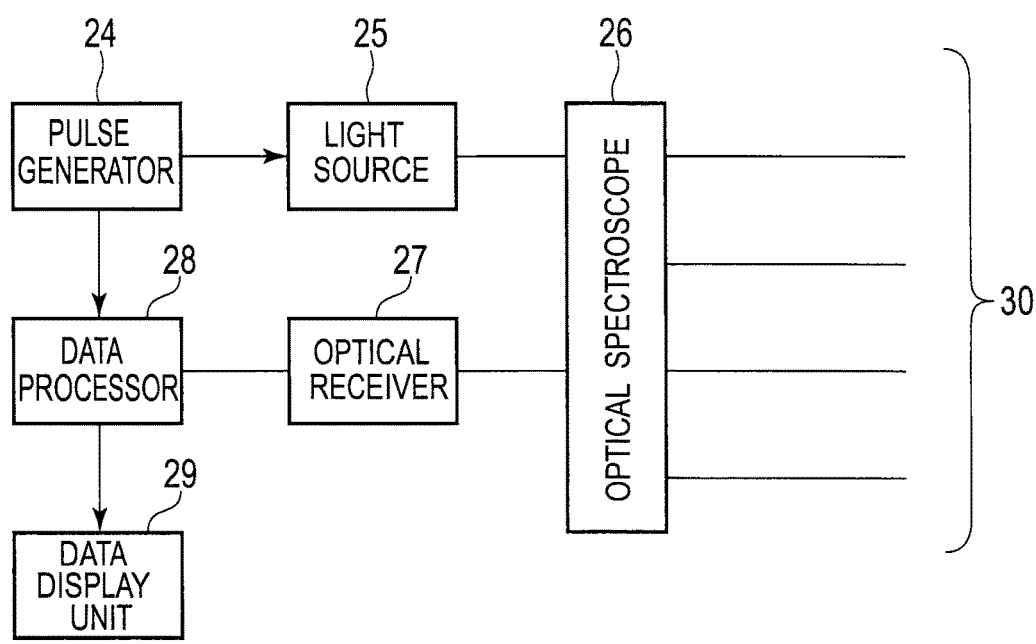
FIG. 6 is a diagram showing a temperature distribution measuring apparatus using the optical fiber temperature sensor according to the present invention.

FIG. 6 is a configuration block diagram showing a temperature distribution measuring apparatus using the optical fiber temperature sensor according to the present invention. Referring to FIG. 6, descriptions will be provided for the temperature distribution measuring apparatus using the optical fiber temperature sensor. The temperature distribution measuring apparatus includes a pulse generator 24, a light source 25, an optical spectroscope 26, an optical receiver 27, a data processor 28 and a data display unit 29.

The pulse generator 24 generates a pulse signal, and outputs the pulse signal to the light source 25. In accordance with the pulse signal from the pulse generator 24, the light source 25 outputs an optical signal to the optical spectroscope 26. The optical spectroscope 26 outputs the optical signal, coming from the light source 25, to as many optical fiber cables 30 as sensors for the sandwich bus bars 10 and the connecting bolts. The optical fiber temperature sensor according to example 1 and the optical fiber temperature sensor according to example 2 can be simultaneously installed in one measuring apparatus.

To this end, the optical spectroscope 26 sends the optical signal to as many optical fiber cables 30 as the sensors, and outputs optical signals, sent from as many optical fiber cables 30 as the sensors, to the optical receiver 27. On the basis of the optical signals from the optical receiver 27, the data processor 28 measures the temperature distribution in a desired location from information on the temperatures of the optical fiber temperature sensors which the optical fiber cables 30 have. The data display unit 29 displays the temperature distribution in the desired location.

INDUSTRIAL APPLICABILITY

The present invention is applicable to cubicle-type high-voltage power receiving and distributing facilities which are more likely to develop trouble due to severe environments such as typhoons, rainfalls and dust, or due to induced magnetic fields.

The invention claimed is:

1. An optical fiber temperature sensor which implements a temperature monitoring function in an interphase insulating material between sandwich bus bars, wherein
   the optical fiber temperature sensor is formed by housing an optical fiber cable in a housing which is formed from an ultra-thin sheet made from an insulating material having insulation quality equal to or higher than the interphase insulating material between the sandwich bus bars, a plurality of ultra-thin columnar members, each made from the same material as the housing, are housed in a plurality of locations in the housing, a plurality of sensor rings are each formed by unfixedly winding a portion of the optical fiber cable with a length equal to or longer than that corresponding to range resolution around the corresponding one of the ultra-thin columnar members, the plurality of sensor rings measure temperatures in the plurality of locations, respectively, silicone sealing is applied to housing side surfaces, and all surfaces of the housing are hermetically sealed with a hermetic sealing member made from a silicone-based liquid insulating material.

2. The optical fiber temperature sensor according to claim 1, wherein a spacer, having the same configuration as the ultra-thin circular members, is disposed so as to fill a space between the sensor rings.

3. An optical fiber temperature sensor configured to monitor temperatures of bolts connecting a first bus bar and a second bus bar together, wherein the optical fiber temperature sensor is formed by housing an optical fiber cable in a housing which is formed from an ultra-thin sheet made from an insulating material, a plurality of ultra-thin columnar members, each made from the same material as is the housing, are housed in a plurality of locations in the housing, a plurality of sensor rings are each formed by unfixedly winding a portion of the optical fiber cable with a length equal to or longer than that corresponding to range resolution around the corresponding one of the ultra-thin columnar members, the plurality of sensor rings measure temperatures in the plurality of locations, respectively, silicone sealing is applied to housing side surfaces, all surfaces of the housing are hermetically sealed with a hermetic sealing member made from a silicone-based liquid insulating material, and the multiple sensor rings have through-holes through which to install the bolts in the sensor rings, respectively.

\* \* \* \* \*